(12) United States Patent
Huffman et al.

(10) Patent No.: US 8,907,770 B2
(45) Date of Patent: Dec. 9, 2014

(54) SYSTEM AND METHOD OF CONTROLLING VEHICLE FUNCTIONS

(75) Inventors: James Huffman, Kansas City, MO (US); Todd W. Jones, Kansas City, MO (US); Darren Kaufman, Olathe, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1267 days.

(21) Appl. No.: 12/026,166

(22) Filed: Feb. 5, 2008

(65) Prior Publication Data

US 2009/0195370 A1    Aug. 6, 2009

(51) Int. Cl.
*B60R 25/10* (2013.01)
*B60R 25/04* (2013.01)
*B60R 25/20* (2013.01)

(52) U.S. Cl.
CPC ............. *B60R 25/2018* (2013.01); *B60R 25/04* (2013.01); *B60R 25/209* (2013.01)
USPC . 340/426.13; 340/5.1; 340/5.61; 340/426.16; 340/426.17; 455/435.1; 701/2

(58) Field of Classification Search
CPC .. B60R 25/04; B60R 25/209; B60R 25/2018; B60R 25/20; B60R 25/24; B60R 25/243; B60R 25/2072; B60R 99/00; B60R 2025/0405; B60R 2025/0415; B60R 2325/205
USPC ......... 340/5.1, 5.2, 5.7–5.72, 426.12–426.13, 340/426.16–426.17, 426.22–426.23; 455/435.1–435.3; 701/2
See application file for complete search history.

(56) References Cited

U.S. PATENT DOCUMENTS

| | | | | |
|---|---|---|---|---|
| 4,067,411 | A * | 1/1978 | Conley et al. | 180/169 |
| 6,028,537 | A * | 2/2000 | Suman et al. | 340/988 |
| 6,148,212 | A * | 11/2000 | Park et al. | 455/456.1 |
| 6,166,627 | A * | 12/2000 | Reeley | 340/426.25 |
| 6,429,773 | B1 | 8/2002 | Schuyler | |
| 6,900,723 | B2 * | 5/2005 | Yamanaka et al. | 340/426.1 |
| 6,937,141 | B2 | 8/2005 | Muramatsu | |
| 7,091,825 | B2 | 8/2006 | Sahai | |
| 7,129,852 | B2 * | 10/2006 | Aslund et al. | 340/426.11 |
| 7,218,925 | B2 | 5/2007 | Crocker et al. | |
| 7,268,664 | B2 * | 9/2007 | Tanaka et al. | 340/5.64 |

(Continued)

OTHER PUBLICATIONS

Brain, Marshall, "How Remote Entry Works," retrieved from the Internet: http://auto.howstuffworks.com/remote-entry.htm, printed on Jan. 8, 2008, 4 pages, HowStuffWorks, Inc.

*Primary Examiner* — Steven Lim
*Assistant Examiner* — Ryan Sherwin
(74) *Attorney, Agent, or Firm* — Toler Law Group, PC

(57) ABSTRACT

A method of controlling vehicle functions is provided that includes receiving at a service provider, security data from a vehicle function system. The security data is related to a security code required to activate one or more functions controlled by the vehicle function system. The method also includes receiving a vehicle function request at the service provider from a remote device. The vehicle function request indicates a request to activate a particular function of a vehicle. In addition, the method includes sending a vehicle function command from the service provider to a mobile wireless device. The vehicle function command is adapted to cause the mobile wireless device to transmit a wireless signal to activate the particular function of the vehicle and the vehicle function command includes the security code or authentication information related to the security code.

25 Claims, 5 Drawing Sheets

(56) References Cited

U.S. PATENT DOCUMENTS

| | | | |
|---|---|---|---|
| 7,308,250 B2* | 12/2007 | Khare et al. | 455/411 |
| 7,483,772 B2* | 1/2009 | Oesterling et al. | 701/2 |
| 7,643,913 B2* | 1/2010 | Taki et al. | 701/2 |
| 7,801,507 B2* | 9/2010 | Benco et al. | 455/410 |
| 7,893,818 B2* | 2/2011 | Smoyer et al. | 340/426.12 |
| 8,121,628 B2* | 2/2012 | Mauti, Jr. | 455/466 |
| 2002/0022979 A1 | 2/2002 | Whipp et al. | |
| 2002/0098835 A1* | 7/2002 | Flick | 455/420 |
| 2004/0066092 A1 | 4/2004 | Muller | |
| 2004/0214596 A1 | 10/2004 | Lee | |
| 2005/0060067 A1* | 3/2005 | Nishida | 701/2 |
| 2005/0283286 A1 | 12/2005 | Kanda et al. | |
| 2006/0001523 A1 | 1/2006 | Underdahl et al. | |
| 2006/0092011 A1* | 5/2006 | Simon et al. | 340/521 |
| 2007/0032225 A1 | 2/2007 | Konicek et al. | |
| 2007/0100514 A1 | 5/2007 | Park | |
| 2007/0130085 A1* | 6/2007 | Zhu | 705/75 |
| 2007/0135092 A1* | 6/2007 | Pieronek et al. | 455/411 |
| 2007/0200671 A1 | 8/2007 | Kelley et al. | |
| 2007/0239565 A1 | 10/2007 | Pentel | |
| 2007/0288127 A1* | 12/2007 | Haq et al. | 701/2 |
| 2008/0071546 A1* | 3/2008 | Beiermeister et al. | 704/273 |

\* cited by examiner

SYSTEM AND METHOD OF CONTROLLING VEHICLE FUNCTIONS

FIELD OF THE DISCLOSURE

The present disclosure is generally related to systems and methods of controlling vehicle functions.

BACKGROUND

Certain functions of a vehicle may be activated while the vehicle is not in operation. For example, a vehicle owner may need to unlock the vehicle after locking their keys inside the vehicle. Spare keys are not always readily available in this situation. Some vehicle manufacturers offer a service to unlock a vehicle remotely without using a key. However, the service is limited to vehicles made by the vehicle manufacturer offering the service.

DETAILED DESCRIPTION

Figure 1:
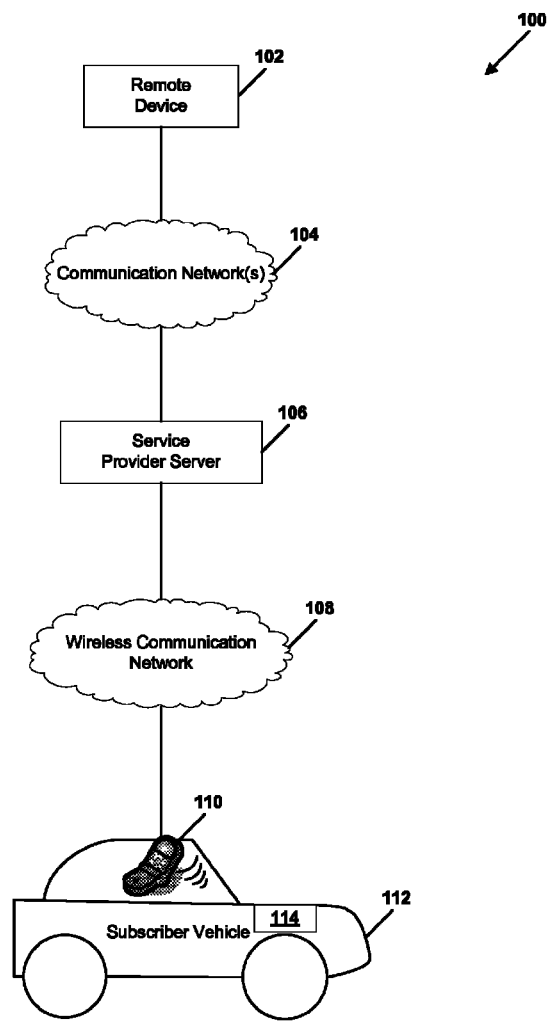
FIG. 1 is a diagram of an embodiment of a system to control vehicle functions.

A system to control vehicle functions is disclosed that includes a communication control module to receive communication data from a remote device. The communication module is also adapted to determine if the communication data indicates a vehicle function request. The vehicle function request indicates a request to activate a particular function of a vehicle and the vehicle is one of a plurality of vehicles associated with a particular remote vehicle function activation service subscription. In addition, the system includes a vehicle function module to identify a security code associated with the vehicle when the communication data indicates the vehicle function request. Each of the plurality of vehicles associated with the remote vehicle function activation service subscription is associated with a different security code and the identified security code is required to activate the particular function of the vehicle. Further, the vehicle function module is adapted to send a vehicle function command to a mobile wireless device. The vehicle function command is adapted to cause the mobile wireless device to transmit a wireless signal to activate the particular function of the vehicle and the vehicle function command includes the identified security code or authentication information related to the identified security code.

In another embodiment, a mobile wireless device is disclosed that includes an antenna and a transceiver coupled to the antenna. The transceiver is adapted to transmit a first set of wireless signals of a first range of frequencies via the antenna. The mobile wireless device also includes a vehicle function transmitter adapted to transmit a second set of wireless signals of a second range of frequencies. Further, the mobile wireless device includes a communication control module to receive communication data from a service provider server via the antenna and the transceiver and determine if the communication data indicates a vehicle function command. The vehicle function command is related to a particular function of a vehicle. In addition, the mobile wireless device includes a vehicle function module to prompt the vehicle function transmitter to transmit a wireless signal when the communication data indicates the vehicle function command. The wireless signal is adapted to activate the particular function of the vehicle.

In another embodiment, a method of controlling vehicle functions is disclosed that includes receiving security data at a service provider from a vehicle function system. The security data is related to a security code required to activate one or more functions controlled by the vehicle function system. The method also includes receiving a vehicle function request at the service provider from a remote device. The vehicle function request indicates a request to activate a particular function of a vehicle. In addition, the method includes sending a vehicle function command from the service provider to a mobile wireless device. The vehicle function command is adapted to cause the mobile wireless device to transmit a wireless signal to activate the particular function of the vehicle and the vehicle function command includes a security code or authentication information related to the security code, wherein the security code is required to activate the particular function of the vehicle.

In another embodiment, a method of controlling vehicle functions is disclosed that includes receiving a vehicle function command at a mobile wireless device from a wireless communication service provider server. The vehicle function command is adapted to cause the mobile wireless device to transmit a wireless signal to activate a particular function of a vehicle and the vehicle function command includes a security code or authentication information related to the security code, where the security code is required to activate the particular function of the vehicle. The method also includes transmitting a wireless signal from the mobile wireless device to activate the particular function of the vehicle in response to receiving the vehicle function command. The wireless signal includes the security code. Further, the mobile wireless device is within the vehicle, yet is not a component of the vehicle.

In another embodiment, a computer-readable storage medium is disclosed that includes operational instructions that, when executed by a processor, cause the processor to receive a vehicle function request at a service provider from a remote device. The vehicle function request indicates a request to activate a particular function of a vehicle. The computer-readable storage medium also includes operational instructions that, when executed by the processor, cause the processor to identify the manufacturer of the vehicle and operational instructions that, when executed by the processor, cause the processor to send a vehicle function command from the service provider to a mobile wireless device. The vehicle function command is adapted to cause the mobile wireless device to transmit a wireless signal to activate the particular function of the vehicle and the vehicle function command is based on the manufacturer of the vehicle.

FIG. 1 is a diagram of an embodiment of a system 100 to control vehicle functions. The system 100 includes a remote device 102 that is adapted to communicate via one or more communication networks 104. The remote device 102 may include a mobile wireless device, such as a hand-held computing device, a smart phone, or a mobile phone, a personal computer, a laptop computer, a Voice over Internet Protocol (VoIP) telephone, or a landline telephone. The one or more communication networks 104 may include a public switched telephone network (PSTN), a wide area wireless communication network, an Internet Protocol network, a cable television network, or any combination thereof.

The remote device 102 may be adapted to communicate with a service provider server 106 via the one or more communication networks 104. The service provider server 106 may be associated with providing a remote vehicle function activation service to a number of subscribers. In an illustrative, non-limiting embodiment, the remote vehicle function activation service may be provided by a communications service company, such as a wireless communications service company, via the service provider server 106. The remote vehicle function activation service may be related to controlling functions of one or more vehicles associated with a subscriber, such as the representative subscriber vehicle 112. For example, the remote vehicle function activation service may be related to unlocking the doors of the subscriber vehicle 112, starting the engine of the subscriber vehicle 112, shutting off the engine of the subscriber vehicle 112, limiting the speed of the subscriber vehicle 112 to a threshold speed, controlling another function or system of the subscriber vehicle 112, or any combination thereof. The subscriber vehicle 112 may be a car, a truck, a sport utility vehicle, a cross-over vehicle, a motorcycle, a boat, a delivery truck, a semi-trailer truck, a bus, an aircraft, or any other vehicle used by a subscriber to travel from one location to another. Additionally, the remote vehicle function activation service may not be limited to any particular vehicle manufacturer and may apply to vehicles manufactured by a plurality of different vehicle manufacturers. Further, the remote vehicle function activation service may be associated with an individual subscription, a family subscription, a company subscription, or any combination thereof, such that specified members of a family or company can utilize the remote vehicle function activation service. Thus, the remote vehicle function activation service may be applied to multiple vehicles and multiple mobile wireless devices may be used to control functions of each of the vehicles associated with a particular vehicle function activation service subscription.

The service provider server 106 may be adapted to communicate with a subscriber mobile wireless device 110 via a wireless communication network 108 to control functions of the subscriber vehicle 112. The wireless communication network 108 may be a wide area wireless communication network associated with a communications service company providing the remote vehicle function activation service.

In an illustrative embodiment, the service provider server 106 receives a vehicle function request from the remote device 102 via the one or more communication networks 104. The vehicle function request indicates a request to activate a particular function of the subscriber vehicle 112. For example, the vehicle function request may be related to unlocking a door of the subscriber vehicle 112 because a subscriber's keys have been locked in the car. The vehicle function request may be submitted to the service provider server 106 by the remote device 102 via a website associated with the remote vehicle function activation service or an interactive voice response (IVR) system associated with the remote vehicle function activation service.

The service provider server 106 may be adapted to determine, after receiving the vehicle function request, if the vehicle function request is related to a subscriber associated with a valid subscription to the remote vehicle function activation service. For example, the service provider server 106 may receive an identification code from the remote device 102. The service provider server 106 may determine if the received identification code matches an identification code associated with a valid subscription to the remote vehicle function activation service.

When the vehicle function request is associated with a valid subscription to the remote vehicle function activation service, the service provider server 106 may be adapted to send a vehicle function command to the subscriber mobile wireless device 110. The vehicle function command is adapted to cause the subscriber mobile wireless device 110 to transmit a wireless signal to activate the requested function of the subscriber vehicle 112. The subscriber mobile wireless device 110 may be within the subscriber vehicle 112, yet not a component of the vehicle. For example, the subscriber mobile wireless device 110 may be lying on a seat of the subscriber vehicle 112, the subscriber mobile wireless device 110 may be in a mobile wireless device cradle within the subscriber vehicle 112, or the subscriber mobile wireless device 110 may be plugged into a mobile wireless device charger within the subscriber vehicle 112. Additionally, the subscriber mobile wireless device 110 may be located in close proximity to the subscriber vehicle 112, such as within several feet of the subscriber vehicle 112, or a farther distance away from the subscriber vehicle 112, such as several miles.

In response to receiving the vehicle function command, the subscriber mobile wireless device 110 may transmit a wireless signal to activate the function of the vehicle associated with the vehicle function command. The wireless signal transmitted by the subscriber mobile wireless device 110 may be a short range wireless signal or a long-range wireless signal. In an illustrative, non-limiting embodiment, the subscriber mobile wireless device 110 may transmit the wireless signal to the subscriber vehicle 112 via a base station of a wide area wireless communication network.

The subscriber vehicle 112 includes a vehicle function system 114 that is adapted to control one or more functions of the subscriber vehicle 112. For example, the vehicle function system 114 may be adapted to control the door locks of the subscriber vehicle 112, the windows of the subscriber vehicle 112, a stereo system of the subscriber vehicle 112, operation of the engine of the subscriber vehicle 112, operation of other mechanical or electrical systems of the subscriber vehicle 112, or any combination thereof. In one embodiment, the subscriber mobile wireless device 110 may transmit the wireless signal to activate a particular function of the subscriber vehicle 112 to the vehicle function system 114. In another embodiment, the subscriber mobile wireless device 110 may transmit the wireless signal to activate a particular function of the subscriber vehicle 112 to a particular controller at the subscriber vehicle 112 related to controlling the particular vehicle function, such as a door lock controller.

The subscriber mobile wireless device 110 may receive a confirmation signal indicating that a requested vehicle function has been activated. For example, the subscriber mobile wireless device 110 may receive a confirmation signal from the vehicle function system 114 of the subscriber vehicle 112 indicating that the doors of the subscriber vehicle have been unlocked. The subscriber mobile wireless device 110 may then forward the confirmation signal to the service provider server 106 and the service provider server 106 may forward data related to the confirmation signal to the remote device 102.

Figure 2:
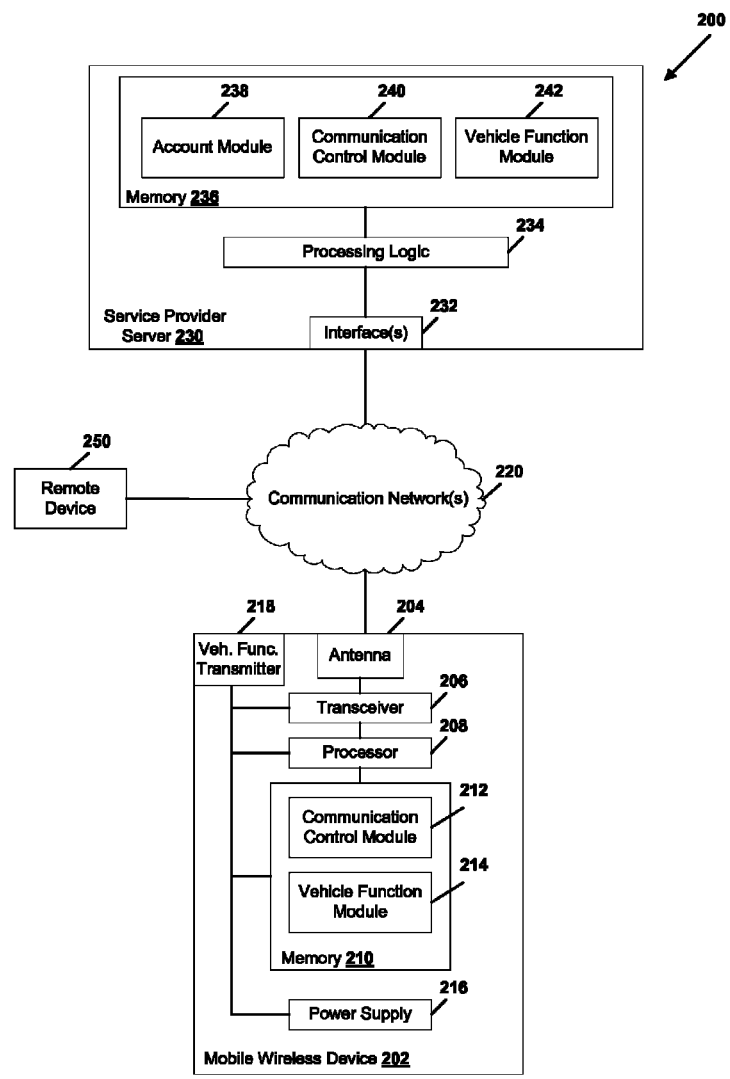
FIG. 2 is a diagram of a second embodiment of a system to control vehicle functions.

FIG. 2 is a diagram of a second embodiment of a system 200 to control vehicle functions. The system 200 includes a mobile wireless device 202 that is adapted to communicate via one or more communication networks 220. The one or more communication networks 220 may include a public switched telephone network (PSTN), a wide area wireless communication network, an Internet Protocol network, a cable television network, or any combination thereof. The system 200 also includes a service provider server 230 and a remote device 250. The service provider server 230 is adapted to communicate with the mobile wireless device 202, the remote device 250, or any combination thereof, via the one or more communication networks 220. The service provider server 230 may be associated with a communication services company, such as a provider of wireless communication services, that provides communication services to the mobile wireless device 202, the remote device 250, or any combination thereof. Further, the service provider server 230 provides services to a user associated with the mobile wireless device 202 related to controlling functions of a vehicle related to the user.

The mobile wireless device 202 includes an antenna 204 and a transceiver 206. In a particular embodiment, the antenna 204 is coupled to the transceiver 206 to send communication data via a wide area wireless communications network. The mobile wireless device 202 also includes a processor 208 and a memory 210. The memory 210 includes a communication control module 212 and a vehicle function module 214. The communication control module 212 and the vehicle function module 214 may be executable by the processor 208 to control functions of a vehicle. Additionally, the mobile wireless device 202 includes a power supply 216, such as a battery, and an optional vehicle function transmitter 218. The vehicle function transmitter 218 may be adapted to transmit wireless signals that are related to controlling a function of a vehicle.

The communication control module 212 may be adapted to receive communication data from the service provider server 230 via the antenna 204 and the transceiver 206. The communication data may be related to phone calls, emails, text messages, website content, other data directed to the mobile wireless device 202, or any combination thereof. In a particular embodiment, the communication control module 212 determines if the communication data indicates a vehicle function command, where the vehicle function command is related to a particular function of a vehicle. For example, the vehicle function command may be related to unlocking a vehicle door, starting the engine of a vehicle, shutting off the engine of a vehicle, limiting the speed of a vehicle to a threshold speed, controlling another mechanical system or electrical system of a vehicle, or any combination thereof. Additionally, the vehicle function command may include a security code or authentication information related to the security code, where the security code is adapted to activate a requested vehicle function. In an illustrative embodiment, the vehicle function command may be related to a vehicle that is owned, leased, or otherwise associated with a user of the mobile wireless device 202. The mobile wireless device 202 may be associated with a subscription to a remote vehicle function activation service provided via the service provider server 230.

In a particular embodiment, the vehicle function module 214 is adapted to transmit a wireless signal when communication data received at the mobile wireless device 202 indicates a vehicle function command. The wireless signal is adapted to activate the particular function of the vehicle indicated by the vehicle function command. The vehicle function module 214 may send the wireless signal to a vehicle function system coupled to the vehicle. The vehicle function module 214 may be adapted to send wireless signals to activate requested vehicle functions via the transceiver 206 and the antenna 204, via the optional vehicle function transmitter 218, or any combination thereof. In an illustrative, non-limiting embodiment, the vehicle function module 214 may be adapted to transmit a wireless signal to activate a particular vehicle function based on a vehicle function command entered manually at the mobile wireless device 202 by a user of the mobile wireless device 202. For example, the vehicle function command may be entered at the mobile wireless device 202 via a graphical user interface provided by the vehicle function module 214.

In an illustrative embodiment, a remote vehicle function activation service is associated with a plurality of vehicle functions and each vehicle function is related to a distinct wireless signal that is adapted to activate the respective vehicle function. The vehicle function module 214 is adapted to identify the particular function of the vehicle indicated by the vehicle function command and transmit the distinct wireless signal to activate the identified function of the vehicle. For example, the vehicle function module 214 may be adapted to transmit a wireless signal within a different frequency range for each respective vehicle function, to transmit data related to activating a particular vehicle function within the wireless signal, or any combination thereof.

The vehicle function module 214 may also be adapted to transmit distinct wireless signals based on the manufacturer of the vehicle. For example, the vehicle function module 214 may be adapted to identify a manufacturer of a vehicle and determine a set of wireless signals accepted by a vehicle control system of a vehicle based on the manufacturer of the vehicle. The vehicle function module 214 may be adapted to transmit a first set of signals to activate functions of a first vehicle manufactured by a first vehicle manufacturer and to transmit a second set of signals to activate functions of a second vehicle manufactured by a second vehicle manufacturer. In an illustrative, non-limiting embodiment, a first set of wireless signals accepted by a vehicle manufactured by a first vehicle manufacturer may be transmitted on a different range of frequencies than a second set of wireless signals accepted by a vehicle manufactured by a second vehicle manufacturer. The vehicle function module 214 may be adapted to identify the manufacturer of the vehicle based on a vehicle function command received from the service provider server 230, where the vehicle function command indicates the vehicle manufacturer.

Further, the vehicle function module 214 may be adapted to transmit a security code within the wireless signal. The security code may be required by a vehicle function system before activating a particular vehicle function. In one example, the security code may be unique to a particular vehicle. In another example, the security code may be related to security data transmitted from a remote keyless entry device of a vehicle to a corresponding vehicle function system. To illustrate, a remote keyless entry device associated with a vehicle and a corresponding vehicle function system may each include a pseudo-random number generator that generates security data, such as a 40-bit code. The pseudo-random number generator of the remote keyless entry device and the pseudo-random number generator of the vehicle function system may both use the same seed value and the same algorithms to generate the security data. The algorithm utilized by the pseudo-random number generators may be a hopping code algorithm, a rolling code algorithm, a blum blum shub algorithm, an inverse congruential generator, a lagged Fibonacci generator, a linear congruential generator, a linear feedback shift register, a multiply with carry algorithm, or a Mersenne twister algorithm. When the security data received from the remote keyless entry device at the vehicle function system matches the expected security data, the vehicle function system activates a requested vehicle function. Each subsequent time that security data is transmitted from the remote keyless entry device, the transmitted security data is used by the remote keyless entry device pseudo-random number generator and the vehicle function system pseudo-random number generator to generate the next valid security data. In this way, the remote keyless entry device and the vehicle function system are synchronized, such that the remote keyless entry device transmits security data that the vehicle function system expects to receive. In some embodiments, the vehicle function system may generate a range of successive valid security data from security data previously received from the remote keyless entry device to account for activations of the remote keyless entry device that may not be received by the vehicle function system, such as activations of the remote keyless entry device that occur outside of a communication range with the vehicle function system.

The security code may be included in a vehicle function command received from the service provider server 230, the security code may be periodically received from the service provider server 230, or any combination thereof. Alternatively, the vehicle function command may include authentication information related to the security code. For example, the authentication information may be associated with a pointer to the security code, where the security code is stored at the mobile wireless device 202. In another example, the authentication information may include a seed value that can be used to generate the security code, a hash value of the security code, or any other type of information that can be used by the mobile wireless device 202 to generate the security code.

Further, the vehicle function module 214 may be adapted to determine that a requested vehicle function has not been activated after a wireless signal has been transmitted to a vehicle function system and the vehicle function module 214 may be adapted to send a request to the service provider server 230 to receive information associated with an updated security code that is acceptable to the vehicle function system. The vehicle function module 214 may also include a pseudo-random number generator that is seeded with the same initial value as a remote keyless entry device of a vehicle. The pseudo-random number generator of the vehicle function module 214 may also include the same pseudo-random number generating algorithm as a remote keyless entry device of a vehicle. The vehicle function module 214 may be adapted to invoke the pseudo-random number generator to generate a security code that is to be transmitted to a vehicle function system. The pseudo-random number generator may utilize authentication information received from the service provider server 230 to generate the security code. Additionally, the vehicle function module 214 may be adapted to verify that the pseudo-random number generator is using current security data associated with a remote keyless entry device of a vehicle to generate the security code by sending a request to the service provider server 230 for the current security data that is acceptable to a vehicle function system coupled to a particular vehicle.

The vehicle function module 214 may store a vehicle function signal table that includes a list of the vehicle functions that may be activated via the mobile wireless device 202 and the corresponding signals may be used to activate each respective vehicle function. The vehicle function signal table may be downloaded from the service provider server 230 when the mobile wireless device 202 is in a remote vehicle function activation service configuration mode and may be updated as new vehicle functions are added to the remote vehicle function activation service, as the signals used to activate the vehicle functions change, or any combination thereof. For example, if a remote vehicle function activation service adds a feature to control a climate control system of a particular vehicle, the vehicle function signal table may be updated to include one or more wireless signals to control the climate control system of the vehicle. Additionally, a vehicle function signal table may be updated when the security code associated with a particular vehicle function system changes.

In some embodiments, the vehicle function module 214 may be adapted to transmit wireless signals to activate particular vehicle functions in response to receiving a vehicle function command from the service provider server 230 via the transceiver 206 and the antenna 204. In other embodiments, the vehicle function module 214 may be adapted to transmit the wireless signals to activate different vehicle functions via the optional vehicle function transmitter 218. The transceiver 206 may be adapted to communicate via a different range of frequencies than the vehicle function transmitter 218. To illustrate, the vehicle function module 214 may send wireless signals within frequency bands used by mobile wireless devices, such as the 700 MHz, 800 MHz, 850 MHz, or 1900 MHz frequency bands, via the transceiver 206 and the antenna 204, to control specified functions of the vehicle. In another illustration, the vehicle function module 214 may send a wireless signal on a same frequency band as the frequency band associated with a remote keyless entry device associated with the vehicle, such as a 300 MHz or 400 MHz frequency band, via the optional vehicle function transmitter 218 to control certain functions of the vehicle. For example, a wireless signal to control the locks of a vehicle may be sent via the vehicle function transmitter 218, while a wireless signal to shut off the engines of a vehicle may be transmitted via the transceiver 206 and the antenna 204. The frequency of a wireless signal adapted to activate a vehicle function system may be retrieved from a vehicle function signal table stored at the vehicle function module 214 or the vehicle function command received from the service provider server 230 may indicate the frequency. In an illustrative, non-limiting embodiment, the optional vehicle function transmitter 218 may be a one-way transmitter.

In a particular embodiment, the service provider server 230 includes one or more interfaces 232 adapted to communicate via the one or more communication networks 220 and processing logic 234, such as one or more independent or redundant processors, coupled to the interfaces 232. The one or more interfaces 232 may include at least one hardware interface, at least one software interface, or any combination thereof. In an illustrative, non-limiting embodiment, the interfaces 232 include a web server. In addition, the service provider server 230 includes a memory 236 and the memory 236 includes an account module 238, a communication control module 240, and a vehicle function module 242.

In a particular embodiment, the account module 238 is adapted to receive an enrollment request to enroll in a remote vehicle function activation service. In an illustrative embodiment, the remote vehicle function activation service is related to controlling vehicle functions via the mobile wireless device 202. The remote vehicle function activation service may apply to vehicles manufactured by a plurality of different vehicle manufacturers. In an illustrative, non-limiting embodiment, the remote vehicle function activation service may be offered by a wireless communication service provider and the mobile wireless device 202 may provide wireless communication services to a subscriber of the wireless communication service provider, in addition to, the remote vehicle function activation service.

Further, the account module 238 is adapted to activate the remote vehicle function activation service with respect to the mobile wireless device 202 after receiving the enrollment request and to establish an account for the requesting subscriber. The account module 238 may be adapted to place the mobile wireless device 202 into a configuration mode after the remote vehicle function activation service has been established to activate hardware, such as the vehicle function transmitter 218, to download software, to provide a vehicle function signal table, to provide a security code or authentication information related to security codes that are adapted to activate particular vehicle functions, or any combination thereof, to enable the mobile wireless device 202 to provide the remote vehicle function activation service. In addition, the account module 238 may charge a fee to an account associated with the remote vehicle function activation service after receiving a vehicle function request related to activating a particular function of a vehicle, after sending a vehicle function command to activate a requested function of a vehicle, or any combination thereof.

In a particular embodiment, the communication control module 240 is adapted to receive communication data from the remote device 250, the mobile wireless device 202, or any combination thereof. The communication data may be related to phone calls, emails, text messages, Internet Protocol data, or any combination thereof. For example, when the service provider server 230 is associated with a wireless communication service provider, the service provider server 230 may be operable to route calls and data to and from the mobile wireless device 202.

Additionally, the communication control module 240 is adapted to determine if the communication data indicates a vehicle function request, where the vehicle function request indicates a request to activate a particular function of a vehicle. The service provider server 230 may receive communication data from the mobile wireless device 202, the remote device 250, or any combination thereof, indicating a vehicle function request. In an illustrative embodiment, the service provider server 230 receives the vehicle function request from the remote device 250 via a website provided by the service provider server 230. In another illustrative embodiment, the service provider server 230 may receives the vehicle function request from the remote device 250 via a phone call. For example, a user of the remote device 250 may call a 1-800 number or another specified phone number associated with a remote vehicle function activation service. The communication control module 240 may invoke the vehicle function module 242 when the communication data indicates a vehicle function request After receiving a vehicle function request, the vehicle function module 242 is adapted to provide one or more interactive voice response (IVR) menus when the vehicle function request is received via a phone call. Additionally, the vehicle function module 242 is adapted to provide one or more graphical user interfaces when the vehicle function request is received via a website. The IVR menus and graphical user interfaces provided by the vehicle function module 242 may be adapted to guide a user through a series of steps related to making a vehicle function request. For example, the vehicle function request IVR menus and graphical user interfaces may be related to a login step, where an identification code, such as an account number, subscriber password, or any combination thereof, are entered. The vehicle function request IVR menus and graphical user interfaces may also be related to a vehicle function selection step where a vehicle function that a subscriber desires to activate is chosen from a list of selectable options.

After the vehicle function module 242 receives an identification code associated with a vehicle function request, the vehicle function module 242 is also adapted to determine if the identification code is associated with a valid subscription to a remote vehicle function activation service. In an illustrative embodiment, the vehicle function module 242 compares an identification code associated with a vehicle function request to a list of identification codes related to valid remote vehicle function activation service subscriptions. The vehicle function module 242 then determines if the received identification code matches an identification code associated with a valid remote vehicle function activation service subscription.

In a particular embodiment, the vehicle function module 242 sends a vehicle function command to the mobile wireless device 202 when the identification code is associated with a valid remote vehicle function activation service subscription related to the mobile wireless device 202. The vehicle function command is adapted to cause the mobile wireless device 202 to transmit a wireless signal to activate the particular function of the vehicle. The vehicle function command may include a security code or authentication information related to the security code that a vehicle function system may expect to receive before activating a requested vehicle function. The vehicle function module 242 may be adapted to request the security code, or authentication information related to the security code, from a vehicle function system of a particular vehicle periodically, in response to receiving a vehicle function request, or any combination thereof. Alternatively, a vehicle function system of a particular vehicle associated with a remote vehicle function activation service subscription may be adapted to periodically send updated security data to the service provider server 230. Further the vehicle function module 242 may be adapted to send periodic updates associated with a security code to the mobile wireless device 202.

The vehicle function module 242 may also send a vehicle function command to the mobile wireless device 202 in response to receiving a vehicle function request indicating an emergency identification code. The emergency identification code may be received from an emergency response entity or a law enforcement entity to activate a particular function of a vehicle in an emergency situation without receiving a subscriber identification code. For example, the remote device 250 may be associated with a law enforcement entity and the service provider server 230 may receive a vehicle function request from the remote device 250 to reduce the speed of a vehicle that has been reported stolen. In another example, the remote device 250 may be associated with an emergency response entity and the service provider server 230 may receive a vehicle function request from the remote device 250 to open the doors of a vehicle after an accident has occurred involving the vehicle.

In an illustrative embodiment, each vehicle function is one of a plurality of vehicle functions associated with the remote vehicle function activation service and the vehicle function module 242 is adapted to send a vehicle function command to the mobile wireless device 202 based on the respective vehicle function requested. For example, the vehicle function module 242 may be adapted to send a first vehicle function command to the mobile wireless device 202 when the vehicle function request is related to unlocking a door of a vehicle and to send a second vehicle function command to the mobile wireless device 202 when the vehicle function request is related to turning on the engine of a vehicle.

Additionally, the vehicle function commands sent by the vehicle function module 242 to the mobile wireless device 202 may be based on the manufacturer of a vehicle. To illustrate, the vehicle function module 242 may be adapted to identify the manufacturer of a vehicle associated with a received vehicle function request and send a first set of vehicle function commands to the mobile wireless device 202 when functions of a first vehicle manufactured by a first vehicle manufacturer are to be activated and to send a second set of vehicle function commands to the mobile wireless device 202 when functions of a second vehicle manufactured by a second vehicle manufacturer are to be activated.

In embodiments where a remote vehicle function activation service subscription is associated with a plurality of vehicles, the vehicle function module 242 may be adapted to identify the particular vehicle associated with a vehicle function request. The vehicle function command sent to the mobile wireless device 202 by the service provider server 230 may be related to the identified vehicle. For example, a vehicle function command transmitted by the service provider server 230 to the mobile wireless device 202 may include information associated with a respective security code of the identified vehicle, a vehicle function command transmitted by the service provider server 230 to the mobile wireless device 202 may be related to the manufacturer of the identified vehicle, or any combination thereof. In this way, the mobile wireless device 202 may be adapted to control vehicle functions of a plurality of different vehicles.

Additionally, in embodiments where a remote vehicle function activation service subscription is associated with a plurality of mobile wireless devices, the vehicle function module 242 may be adapted to send the vehicle function command to one or more of the plurality of mobile wireless devices. In one example, a vehicle function request received at the service provider server 230 may indicate a particular mobile wireless device to activate a requested vehicle function. In another example, the vehicle function module 242 may be adapted to determine a location of a mobile wireless device that corresponds to the location of a vehicle associated with a received vehicle function request and transmit a vehicle function command to the mobile wireless device that is closest to the vehicle. The vehicle function module 242 may be adapted to determine the location of a mobile wireless device, of a vehicle associated with a vehicle function request, or any combination thereof, based on Global Positioning System (GPS) data, data received from one or more elements of a wireless communication network, such one or more base transceiver stations, or any combination thereof. In still another example, the vehicle function module 242 may be adapted to send a vehicle function command to each of the plurality of mobile wireless devices associated with a remote vehicle function activation service subscription.

In an illustrative, non-limiting embodiment, the vehicle function module 242 may be adapted to provide a graphical user interface to a service representative terminal of a remote vehicle function activation service provider to respond to a vehicle function request. For example, the graphical user interface may indicate that a valid vehicle function request has been received and the service representative may initiate sending the vehicle function command to the mobile wireless device 202 via the graphical user interface. The vehicle function module 242 may also be adapted to automatically send the vehicle function command to a vehicle without any service representative interaction.

The vehicle function module 242 may be adapted to receive a confirmation signal indicating that a particular vehicle function has been activated at a vehicle. The vehicle function module 242 may receive the confirmation signal from the vehicle, from the mobile wireless device 202, or any combination thereof. Alternatively, the confirmation signal may indicate that a wireless signal has been transmitted by the mobile wireless device 202 to activate a particular vehicle function. After receiving the confirmation signal, the vehicle function module 242 may send confirmation data to a communication device associated with the vehicle function request, such as the remote device 250, indicating that the particular vehicle function has been activated at the vehicle.

In one embodiment, each of the modules 212-214 and 238-242 can represent instructions that are executable by the processor 208 or the processing logic 234, such as instructions embodied in one or more software programs stored at a memory, such as the memory 210 or the memory 236. In another embodiment, the modules 212-214 and 238-242 can represent hardware, software instructions, or any combination thereof.

Figure 3:
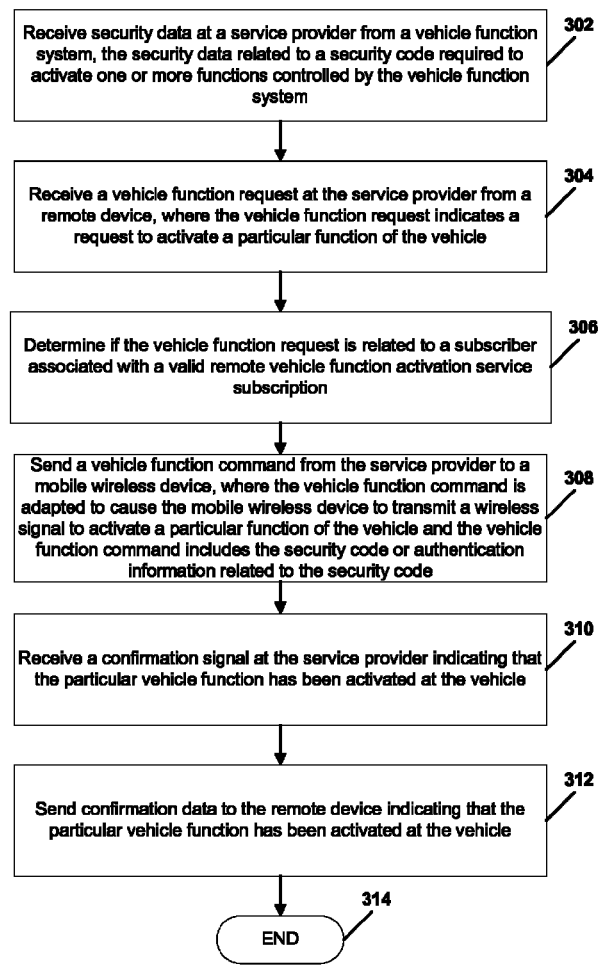
FIG. 3 is a flow diagram of an embodiment of a method of controlling vehicle functions.

FIG. 3 is a flow diagram of an embodiment of a method of controlling vehicle functions. At 302, a service provider receives security data from a vehicle function system. The security data is related to a security code required to activate one or more functions controlled by the vehicle function system. Moving to 304, the service provider receives a vehicle function request from a remote device. The vehicle function request may indicate a request to activate a particular function of a vehicle. Proceeding to 306, the service provider determines if the vehicle function request is related to a subscriber associated with a valid subscription to a remote vehicle function activation service.

At 308, the service provider sends a vehicle function command to a mobile wireless device associated with the subscriber when the subscriber is associated with a valid subscription to the remote vehicle function activation service. The vehicle function command is adapted to cause the mobile wireless device to transmit a wireless signal to activate the particular function of the vehicle. In addition, the vehicle function command includes the security code or authentication information related to the security code, such as a seed value that can be used by a pseudo-random number generating algorithm to generate the security code. Moving to 310, the service provider receives a confirmation signal indicating that the particular vehicle function has been activated at the vehicle. The service provider may receive the confirmation signal from the mobile wireless device or from the vehicle. Proceeding to 312, the service provider sends confirmation data to the remote device indicating that the particular vehicle function has been activated at the vehicle. The method terminates at 314.

Figure 4:
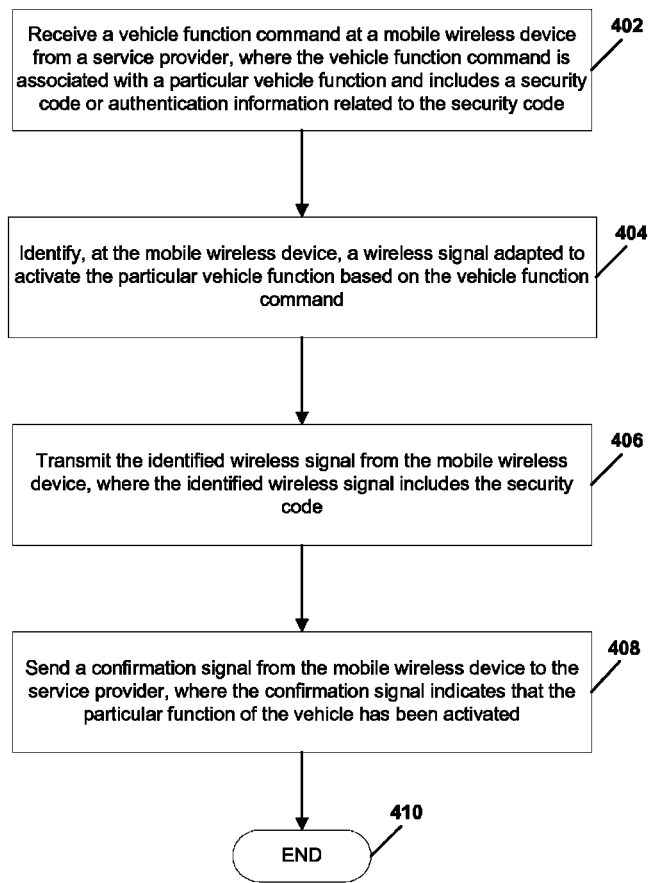
FIG. 4 is a flow diagram of a second embodiment of a method of controlling vehicle functions.

FIG. 4 is a flow diagram of a second embodiment of a method of controlling vehicle functions. At 402, a mobile wireless device receives a vehicle function command from a service provider, where the vehicle function command is associated with a particular function of a vehicle. In addition, the vehicle function command includes the security code or authentication information related to the security code. The security code is required to activate the particular function of the vehicle. The mobile wireless device may be located within the vehicle, yet not a component of the vehicle, or the mobile wireless device may be located some distance from the vehicle. Moving to 404, the mobile wireless device identifies a wireless signal adapted to activate the particular vehicle function based on the vehicle function command. The mobile wireless device may choose a distinct signal from a plurality of signals where each distinct signal is associated with activating a respective function of the vehicle.

Proceeding to 406, the mobile wireless device transmits the identified wireless signal. The wireless signal includes the security code needed to activate the particular function of the vehicle. In an illustrative embodiment, the mobile wireless device transmits the identified wireless signal to a vehicle function system that is coupled to the vehicle. At 408, the mobile wireless device sends a confirmation signal to the service provider, where the confirmation signal indicates that the particular function of the vehicle has been activated. The method terminates at 410.

According to particular embodiments, a subscriber to a remote vehicle function activation service can conveniently send requests to a service provider to control functions of their vehicle via a personal mobile wireless device. The subscriber can participate in the remote vehicle function activation service independent of the manufacturer of the subscriber's vehicle and multiple vehicles may be controlled via one or more mobile wireless devices. Additionally, utilizing a personal mobile wireless device to control functions of a subscriber's vehicle aids in incorporating personal mobile wireless devices further into a subscriber's daily way of life. Further, the remote vehicle function activation service can be offered by the same wireless communication provider that provides a subscriber with wireless communication services, thus helping to reduce subscriber turnover.

Figure 5:
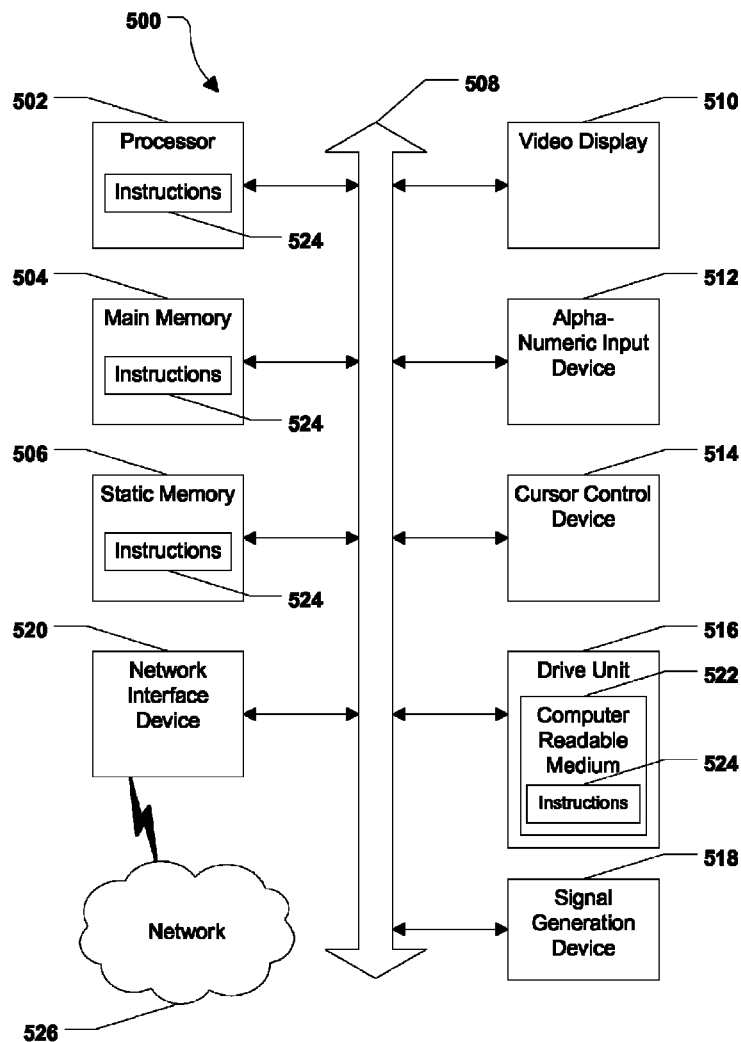
FIG. 5 is a block diagram of an illustrative general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a service provider server, a mobile wireless device, a vehicle function system, or a remote device, as shown in FIGS. 1-2.

In a networked deployment, the computer system may operate in the capacity of an IPTV server, such as a video server or application server, or a set-top box device. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of controlling vehicle functions, the method comprising:
    sending a request for security data representative of a security code from a service provider to a vehicle function system of a vehicle independent of receiving a vehicle function request at the service provider, the security code usable to activate a particular function controlled by the vehicle function system, wherein the security data is generated by the vehicle function system;
    receiving, at the service provider, the security data from the vehicle function system prior to receiving the vehicle function request at the service provider;
    determining the security code based on the received security data;
    storing the received security data, the security code, or both, at the service provider;
    receiving the vehicle function request at the service provider from a remote device, wherein the vehicle function request indicates a request to activate the particular function of the vehicle;
    selecting a particular mobile wireless device of multiple mobile wireless devices associated with a subscription account based on a location of the particular mobile wireless device and based on a location of the vehicle; and
    in response to receiving the vehicle function request, sending a vehicle function command from the service provider to the particular mobile wireless device, wherein the vehicle function command is adapted to cause the particular mobile wireless device to automatically transmit a wireless signal to the vehicle function system to activate the particular function of the vehicle, wherein the vehicle function command includes the security code, and wherein the wireless signal includes the security code.

2. The method of claim 1, further comprising determining whether the vehicle function request is related to a subscriber associated with the subscription account.

3. The method of claim 2, wherein the vehicle function command is sent from the service provider to the particular mobile wireless device when the subscriber is associated with the subscription account and is associated with the particular mobile wireless device.

4. The method of claim 3, further comprising generating a graphical user interface, wherein the graphical user interface is adapted to indicate the vehicle function request and to initiate sending of the vehicle function command to the particular mobile wireless device.

5. The method of claim 2, wherein the subscription account is associated with a remote vehicle function activation service that applies to vehicles manufactured by a plurality of different vehicle manufacturers, the method further comprising sending manufacturer information to the particular mobile wireless device to enable the particular mobile wireless device to select a particular set of wireless signals, where the particular set of wireless signals correspond to vehicles of a particular manufacturer.

6. The method of claim 1, further comprising:
receiving an enrollment request associated with the particular mobile wireless device, wherein the enrollment request relates to providing a remote vehicle function activation service via the particular mobile wireless device; and
activating the remote vehicle function activation service with respect to the particular mobile wireless device.

7. The method of claim 6, wherein activating the remote vehicle function activation service with respect to the particular mobile wireless device comprises:
establishing the subscriber account; and
placing the particular mobile wireless device into a configuration mode including activating hardware of the particular mobile wireless device, downloading software to the particular mobile wireless device, providing the security code or authentication information related to the security code to the particular mobile wireless device, or any combination thereof.

8. The method of claim 6, wherein activating the remote vehicle function activation service with respect to the particular mobile wireless device comprises placing the particular mobile wireless device into a configuration mode including providing a vehicle function signal table to the particular mobile wireless device, wherein the vehicle function signal table includes a plurality of vehicle function commands and a plurality of wireless signals, wherein a particular vehicle function command of the plurality of vehicle function commands is associated with a particular wireless signal of the plurality of wireless signals, and wherein the particular mobile wireless device is adapted to transmit the particular wireless signal in response to receiving the particular vehicle function command.

9. The method of claim 1, further comprising after sending the vehicle function command to the particular mobile wireless device, charging a fee to the subscription account.

10. A method of controlling vehicle functions, the method comprising:
receiving a vehicle function command at a mobile wireless device selected from multiple mobile wireless devices associated with a subscription account based on a location of the mobile wireless device and based on a location of a vehicle, wherein the vehicle function command is received from a wireless communication service provider server, wherein the vehicle function command includes security data, wherein the security data is usable to activate a particular function of the vehicle; and
in response to receiving the vehicle function command, automatically transmitting a wireless signal directly from the mobile wireless device to a vehicle function system to activate the particular function of the vehicle, the wireless signal including a security code based on the security data, wherein the mobile wireless device is within the vehicle and is not a component of the vehicle.

11. The method of claim 10, wherein the particular function of the vehicle is one of unlocking a vehicle door, starting an engine of the vehicle, shutting off the engine of the vehicle, or limiting a speed of the vehicle to a threshold speed.

12. The method of claim 11, wherein the mobile wireless device is adapted to transmit a distinct wireless signal to activate each respective vehicle function.

13. The method of claim 10, wherein automatically transmitting the wireless signal directly from the mobile wireless device to the vehicle function system comprises selecting a particular transmitter from multiple transmitters at the mobile wireless device wherein the wireless signal is transmitted via the particular transmitter, and wherein the particular transmitter is selected based on a vehicle function signal table stored at the mobile wireless device.

14. The method of claim 10, further comprising generating the security code based on a seed value and an algorithm used by a keyless entry device associated with the vehicle.

15. The method of claim 10, further comprising determining at the mobile wireless device, whether the particular function of the vehicle has been activated and sending a request to the wireless communication service provider server for updated security data in response to determining that the particular function has not been activated.

16. A system to facilitate control of vehicle functions of a remote vehicle, the system comprising:
a communication control module configured to:
receive communication data from a remote device; and
determine whether the communication data indicates a vehicle function request, wherein the vehicle function request indicates a request to activate a particular function of the vehicle; and
a vehicle function module configured to:
send a request for security data representative of a security code to a vehicle function system of the vehicle independent of receiving the vehicle function request;
receive the security data from the vehicle function system prior to receiving the vehicle function request, wherein the received security data was generated by the vehicle function system;
determine a security code based on the received security data;
store the received security data, the security code, or both;
determine whether the vehicle function request is related to a subscriber associated with a subscription account associated with a remote vehicle function activation service;
identify the security code when the communication data indicates the vehicle function request and the subscription account wherein the security code is usable to activate the particular function of the vehicle;
select a particular mobile wireless device of multiple mobile wireless devices associated with the subscription account based on a location of the particular mobile wireless device and based on a location of the vehicle; and
send a vehicle function command to the particular mobile wireless device, wherein the vehicle function command is adapted to cause the particular mobile wireless device to automatically transmit a wireless signal to the vehicle function system to activate the particular function of the vehicle, wherein the vehicle function command includes the security code, and wherein the wireless signal includes the security code.

17. The system of claim 16, wherein the vehicle function module receives a confirmation signal indicating that the particular vehicle function has been activated at the vehicle.

18. The system of claim 17, wherein the vehicle function module receives the confirmation signal from the vehicle.

19. The system of claim 17, wherein the vehicle function module receives the confirmation signal from the particular mobile wireless device.

20. The system of claim 17, wherein the vehicle function module sends confirmation data to the remote device, the confirmation data indicating that the particular vehicle function has been activated at the vehicle.

21. The system of claim 16, wherein the vehicle function module periodically requests the security code from the vehicle function system and wherein the periodic requests are independent of the vehicle function request.

22. The system of claim 16, wherein the vehicle function module is further configured to receive a first identification code from the remote device, and wherein the determination of whether the vehicle function request is related to the subscriber includes determining whether the first identification code matches a second identification code, the second identification code associated with the subscription account.

23. A mobile wireless device, comprising:
an antenna;
a transceiver coupled to the antenna, wherein the transceiver is adapted to transmit a first set of wireless signals using a first range of frequencies via the antenna;
a vehicle function transmitter adapted to transmit a second set of wireless signals using a second range of frequencies;
a communication control module configured to:
  receive communication data from a service provider server via the antenna and the transceiver, the communication data indicating selection of the mobile wireless device from multiple mobile wireless devices associated with a subscription account based on a location of the mobile wireless device and based on a location of a vehicle; and
  determine if the communication data indicates a vehicle function command, wherein the vehicle function command is related to a particular function of the vehicle; and
a vehicle function module configured to prompt the vehicle function transmitter to automatically transmit a wireless signal in response to the communication data indicating the vehicle function command, wherein the wireless signal includes a security code, and wherein the wireless signal is adapted to activate the particular function of the vehicle.

24. The mobile wireless device of claim 23, wherein the first set of wireless signals is associated with a first set of vehicle function commands and the second set of wireless signals is associated with a second set of vehicle function commands.

25. A computer-readable storage device storing instructions that, when executed by a processor, cause the processor to perform operations comprising:
  sending a request for security data representative of a security code from a service provider to a vehicle function system of a vehicle independent of receiving a vehicle function request at the service provider, the security code usable to activate a particular function controlled by the vehicle function system, wherein the security data is generated by the vehicle function system;
  receiving, at the service provider, the security data from the vehicle function system prior to receiving the vehicle function request at the service provider;
  determining the security code based on the received security data;
  storing the received security data, the security code, or both, at the service provider;
  receiving the vehicle function request at the service provider from a remote device, wherein the vehicle function request indicates a request to activate the particular function of the vehicle;
  receiving a first identification code from the remote device;
  determining whether the first identification code matches a second identification code, the second identification code associated with a subscription to a remote vehicle function activation service;
  selecting a mobile wireless device of multiple mobile wireless devices associated with a subscription account based on a location of the mobile wireless device and based on a location of the vehicle; and
  in response to receiving the vehicle function request and determining that the first identification code matches the second identification code, sending a vehicle function command from the service provider to the mobile wireless device, wherein the vehicle function command is adapted to cause the mobile wireless device to automatically transmit a wireless signal to the vehicle function system to activate the particular function of the vehicle, wherein the vehicle function command includes the security code, and wherein the wireless signal includes the security code.

* * * * *